(No Model.)
A. ROBERTS.
CHECK ROW ATTACHMENT.
No. 442,641. Patented Dec. 16, 1890.
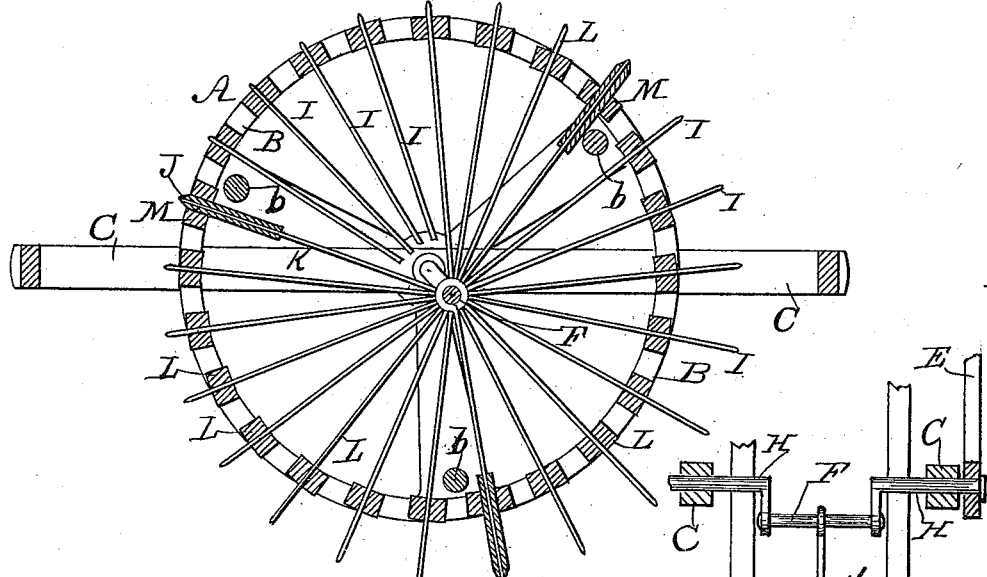
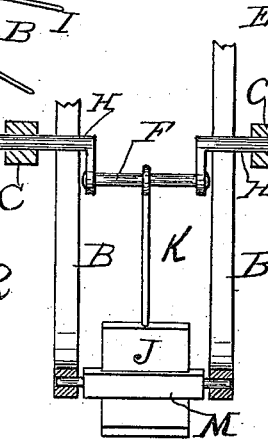
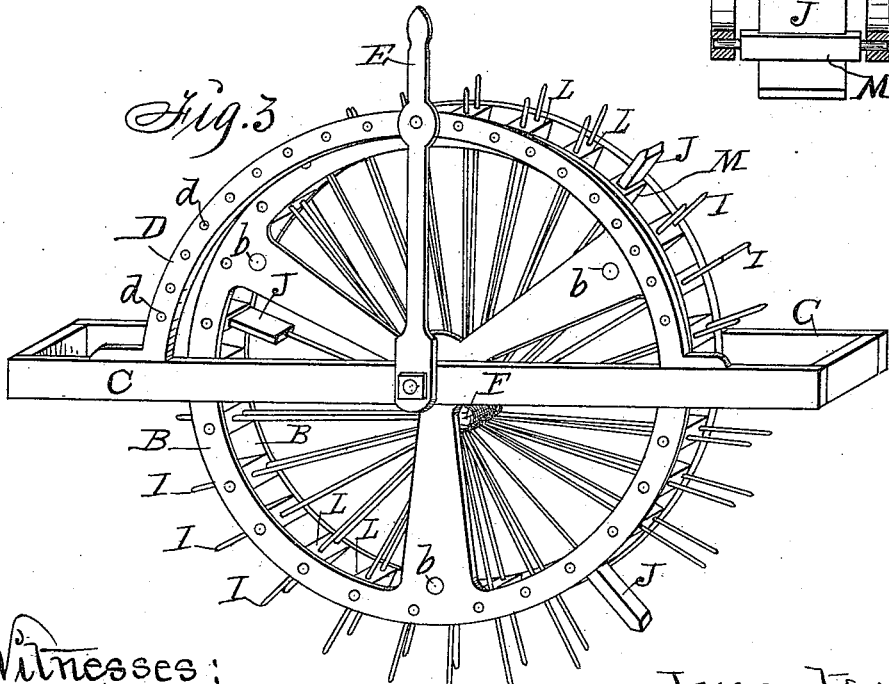
Witnesses:
M. P. Smith
R. H. Orwig
Inventor:
Andrew Roberts,
By Thomas G. Orwig, Atty.

United States Patent Office.

ANDREW ROBERTS, OF FONDA, IOWA.

CHECK-ROW ATTACHMENT.

SPECIFICATION forming part of Letters Patent No. 442,641, dated December 16, 1890.

Application filed March 20, 1890. Serial No. 344,681. (No model.)

*To all whom it may concern:*

Be it known that I, ANDREW ROBERTS, a citizen of the United States of America, residing at Fonda, in the county of Pocahontas, in the State of Iowa, have invented a new and useful Attachment for Check-Row Planters, of which the following is a specification.

My object is to provide an auxiliary wheel for check-row planters, which may be connected or geared to the feed or dropping valve or slide of the planter, and which is adapted by cam mechanism or other well-known means of actuating connection to open and close said slide at regular intervals of the rotation of the auxiliary wheel, and also in the provision of means by which the operator may be enabled to so regulate the attachment as that the seed may be dropped in such a manner as to form regular check-rows, accomplishing this result readily and effectively, whatever the character of soil or the conformation of the ground over which the planter is being operated.

My invention consists, primarily, in a circular wheel formed in two parts bolted together, an adjustable shaft mounted within the frame and so bent as to form crank-arms, a series of loosely-connected spokes extending radially from the adjustable shaft, and a series of markers also connected loosely to said shaft, extending radially therefrom, arranged at thirds of the circumference of the wheel, and a quadrant and lever, which latter is connected to the axle of the wheel, and in certain details of construction and arrangement of parts hereinafter more particularly described.

In the accompanying drawings, Figure 1 is a sectional side view of my invention. Fig. 2 is a detail view of one of the markers and crank; and Fig. 3 is a perspective side view of the attachment.

A represents a wheel formed in two parts B B, bolted together by bolts *b b*, and C the frame upon which the wheel is mounted. Secured to said frame is a quadrant or sector D, provided with perforations *d d* to receive a lug on the lever E. If preferred, a pawl and ratchet may be used.

I provide an adjustable shaft F, arranged relatively eccentric to the axis of the wheel A by bending said shaft so as to form two cranks, the journals H of the shaft having their bearings in the frame C and constituting the axles of the wheel A. Mounted loosely on said shaft F are radially-extending friction spokes or arms I I.

Arranged at intervals or points relatively to the thirds of the circumference of the wheel A are the markers J J, whose arms K K are also loosely attached to the adjustable shaft F.

L L are cross-pieces pivoted within the two parts B B of wheel A, the friction spokes or arms I I passing through perforations in said cross-pieces L L, which thus act as guides for said spokes or arms.

The marker cross-pieces M M, which are preferably made larger than the cross-pieces L L, are slotted to permit of the passage of the markers J J, said pieces M M thus acting as guides therefor.

The frame C of the wheel A may be attached to the body portion of the planter in such a manner and in such a position that the lever E will be conveniently accessible to the operator, and best adapted to permit the transmission of the motion of the wheel A to open and close the dropping-slide of the planter at the desired intervals. The distance between rows may be determined by the points on the circumference of wheel A, at which its motion is transmitted to the seed-dropping valve or slide, which may be accomplished by cams or other well-known means of connection.

I do not desire to be understood as limiting myself to the transmission of motion of the wheel to the dropping-slide at thirds of the circumference of said wheel only.

Since the uniformity of the rows depends upon the accuracy with which the dropping-slide is opened and closed, and since this latter depends upon the character and conformation of the soil, it is eminently important that the operator should be provided with means by which to determine the points on parallel courses or rows at which seed has been dropped, and to regulate the frictional contact of the wheel or other means by which the dropping-slide is opened and closed, in accordance with the character of the soil, whether it be hard or soft, or the conformation of the surface, whether it be hilly or plane.

It will be seen that in my invention at each point when the motion of the wheel A is transmitted to open and close the dropping-slide a marker is brought into action which indicates to the operator the points at which the seed is dropped. The wheel is revolved by the points of the friction or spoke arms engaging with the ground as the planter is drawn along. When the operator discovers from comparison of the impressions made by the markers that the wheel is not revolving uniformly, the said friction-arms may be caused to sink deeper into the soil if the latter be soft, or raised out of the ground if it be hard, by means of the lever E, which raises or lowers the shaft F, shortening or lengthening that portion of the friction-arms extending beyond cross-pieces L L, and thus in soft soil a firmer grip may be obtained and in hard soil the portion of the friction-arms extending beyond the cross-pieces may be shortened.

Having thus described my invention, what I claim as new, and desire to secure by Letters Patent of the United States, is—

In an attachment for a check-row planter, the combination of a wheel formed in two parts connected together, the shaft of which has its bearings in a frame adapted for attachment to a corn-planter, said shaft being bent at each side to provide crank-arms and form a certain portion of the length of said shaft eccentric relatively to the axis of the said wheel, friction spokes or arms mounted loosely about said eccentric portion of the shaft and radiating therefrom, guide-pieces pivoted between the two parts of said wheel and perforated to permit the passage of the friction-spokes, marker-arms also mounted loosely about said eccentric portion of the shaft, and marker guide-pieces pivoted between the two parts of the wheel and slotted to permit the passage of the markers, together with a lever adapted to be actuated by the operator, said lever being fixed to one end of the shaft, as and for the purposes set forth.

ANDREW ROBERTS.

Witnesses:
D. S. McCARVILLE,
J. B. GRETTON.